(12) United States Patent
Hernou et al.

(10) Patent No.: US 12,185,868 B2
(45) Date of Patent: Jan. 7, 2025

(54) AUTOMATED HEATING AND/OR FOAMING APPARATUS AND HEATING AND/OR FOAMING METHOD

(71) Applicant: LABRINTS BVBA, Puurs (BE)

(72) Inventors: Peter Hernou, Antwerp (BE); Ting-Ting Chang, Hsinchu (TW); Hsiao-Chun Ting, Miaoli County (TW); Robbie Vincke, Hsinchu (TW)

(73) Assignee: LABRINTS BVBA, Puurs (BE)

( * ) Notice: Subject to any disclaimer, the term of this patent is extended or adjusted under 35 U.S.C. 154(b) by 0 days.

(21) Appl. No.: 17/753,152

(22) PCT Filed: Aug. 26, 2020

(86) PCT No.: PCT/EP2020/073861
§ 371 (c)(1),
(2) Date: Feb. 22, 2022

(87) PCT Pub. No.: WO2021/037918
PCT Pub. Date: Mar. 4, 2021

(65) Prior Publication Data
US 2022/0202232 A1   Jun. 30, 2022

Related U.S. Application Data

(60) Provisional application No. 62/891,606, filed on Aug. 26, 2019.

(51) Int. Cl.
*A47J 31/44* (2006.01)
*A23L 2/54* (2006.01)
(Continued)

(52) U.S. Cl.
CPC ............. *A47J 31/4489* (2013.01); *A23L 2/54* (2013.01); *A47J 31/4425* (2013.01); *A47J 31/5253* (2018.08); *A47J 31/60* (2013.01)

(58) Field of Classification Search
CPC .... A47J 31/5253; A47J 31/60; A47J 31/4425; A47J 31/4403; A47J 31/4489; A23L 2/54
(Continued)

(56) References Cited

U.S. PATENT DOCUMENTS

| | | | |
|---|---|---|---|
| 2014/0264972 A1* | 9/2014 | Studor | B01F 35/1452 261/121.1 |
| 2015/0104548 A1* | 4/2015 | Yip | A47J 31/4489 137/334 |
| 2019/0191922 A1* | 6/2019 | Ambrosini | A47J 31/4489 |

FOREIGN PATENT DOCUMENTS

| | | |
|---|---|---|
| DE | 10-2004-063279 A1 | 7/2006 |
| EP | 2482700 A1 | 8/2012 |

(Continued)

OTHER PUBLICATIONS

ISR-WO dated Apr. 19, 2021 for parent application PCT/EP2020/073861.

*Primary Examiner* — Phuong T Nguyen
(74) *Attorney, Agent, or Firm* — Vorys, Sater, Seymour and Pease LLP

(57) ABSTRACT

An automated heating and/or foaming apparatus and a method for heating and/or foaming a liquid are disclosed. The apparatus includes a stage, a liquid sensor, a measuring sensor, and a steam pipe. The stage is configured to support a container holding a consumable liquid. The liquid sensor is configured to recognize a type of the consumable liquid. The measuring sensor is configured to detect a surface level of the consumable liquid. The steam pipe includes a nozzle configured to inject water vapor or compressed gas into the consumable liquid to heat and/or foam the consumable liquid. A position of the nozzle in the consumable liquid relative to the surface level of the consumable liquid is (Continued)

adjusted based on the type and/or volume of the consumable liquid detected by the consumable liquid sensor and/or measuring sensor.

6 Claims, 13 Drawing Sheets

(51) Int. Cl.
*A47J 31/52* (2006.01)
*A47J 31/60* (2006.01)

(58) Field of Classification Search
USPC .................. 99/290, 291, 293, 295, 300, 281
See application file for complete search history.

(56) References Cited

FOREIGN PATENT DOCUMENTS

| EP | 3376917 A1 | 9/2018 |
|----|------------|--------|
| WO | 2018044160 A1 | 3/2018 |
| WO | 2021037918 A1 | 3/2021 |

* cited by examiner

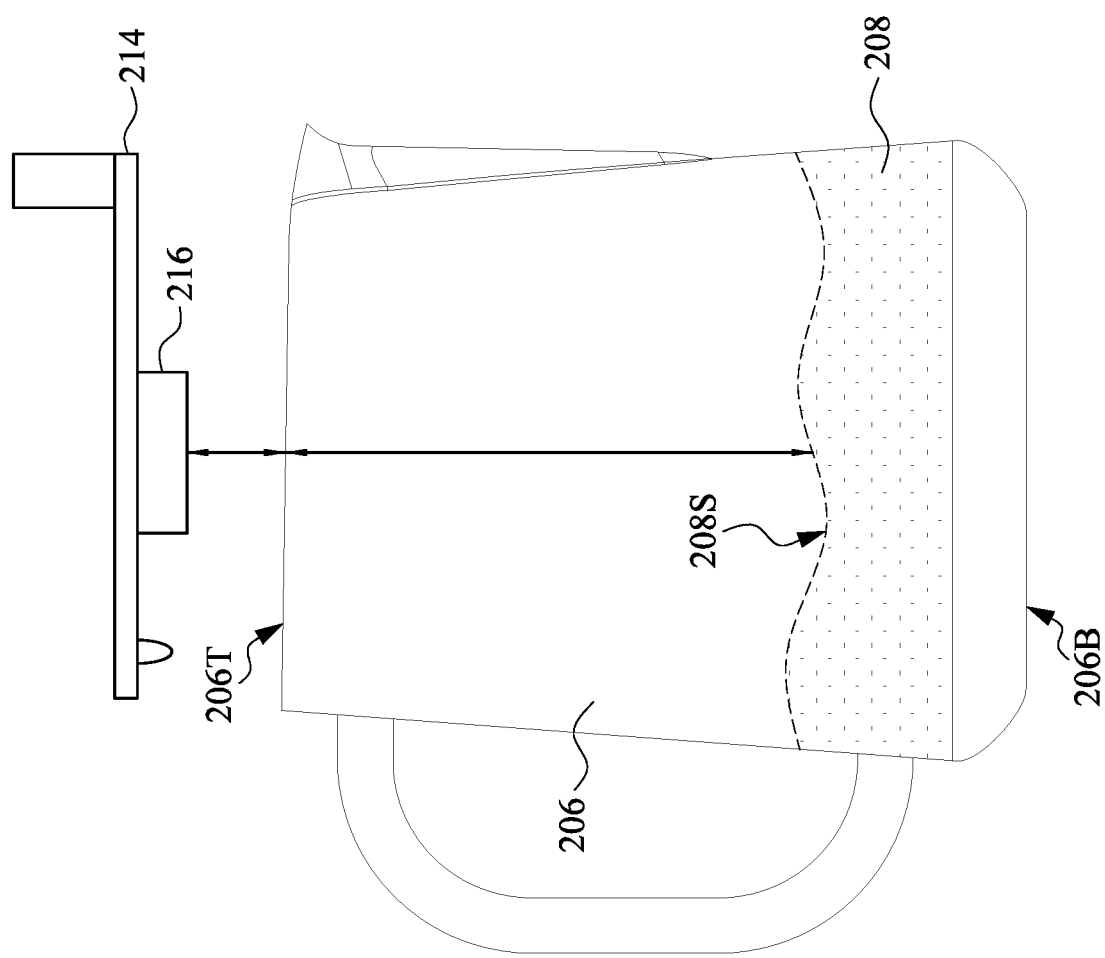

AUTOMATED HEATING AND/OR FOAMING APPARATUS AND HEATING AND/OR FOAMING METHOD

CROSS-REFERENCE TO RELATED APPLICATION

This application claims the benefit of U.S. Provisional Application No. 62/891,606, filed on Aug. 26, 2019, which is incorporated by reference in its entirety.

TECHNICAL FIELD

The present disclosure relates to a heating and/or foaming apparatus and a method for heating and/or foaming a liquid, and more particularly, to automatically heating and/or foaming the liquid with a number of sensors.

BACKGROUND

When generating or producing beverages having consumable liquids like milk such as latte, cappuccino, or chocolate drink, a heating and/or foaming process is performed to the desired and accurate heating of the liquid and/or to create bubbles within the milk to create the milk foam. The liquid and/or the foam is often generated without accurate temperature control, quality control, stability control, foam quality and/or foam volume control. For example, a coffee barista may hold a pitcher containing milk and sense the temperature of the milk with his/her bare hand. In addition, treating and preparing liquids require a degree of quality control that depends on the preparer having a level of skill or experience that is beyond those of many employees preparing the consumable liquid such as milk, mostly due to lack of training or available time. A barista, a chef or a user working with any sorts of consumable liquids for the purpose of heating them and/or foaming it, there is a lot of stress with consumable liquids for creating them uniformly and fast. With the increasing demand for quality and stability in the preparation of consumable liquids such as dairy and non-dairy, the industry is seeking routes to address the above issues. For example, attempts have been made to build a heating and/or forming apparatus as disclosed in US20170215631A1, US20140264972A1, WO2018211003 A1, US20170359996A1 and U.S. Pat. No. 9,737,081B2.

SUMMARY

One aspect of the present disclosure provides an automated heating and/or foaming apparatus.

An automated heating and/or foaming apparatus according to some embodiments of the present disclosure includes a body, a stage, a liquid sensor, a measuring sensor, and a steam pipe. The stage is connected to the body and is configured to support a container holding a consumable liquid. The liquid sensor is connected to the body and is configured to recognize a type of the consumable liquid. The measuring sensor is configured to detect a surface level and/or volume of the consumable liquid. The steam pipe is connected to the body. The steam pipe includes a nozzle configured to inject water vapor or compressed gas into the consumable liquid to heat and/or foam the consumable liquid.

In some embodiments, the automated heating and/or foaming apparatus further includes a temperature sensor connected to the body and configured to detect a temperature of the consumable liquid and/or a temperature of the container holding the consumable liquid.

In some embodiments, the consumable liquid is heated to a target temperature by the water vapor provided by the steam pipe.

In some embodiments, the target temperature of the consumable liquid and/or the container holding the consumable liquid is determined according to the type of the consumable liquid, and the target temperature of the consumable liquid and/or the container holding the consumable liquid is monitored by the temperature sensor.

In some embodiments, the stage includes a moving stage and is configured to adjust the position of the surface level of the consumable liquid relative to the nozzle.

In some embodiments, the steam pipe includes a moving element, and configured to adjust the position of the nozzle within the consumable liquid.

In some embodiments, the automated heating and/or foaming apparatus further includes at least one cleaning pipe configured to spray water vapor, water and/or compressed gas on the steam pipe to clean the steam pipe.

In some embodiments, a position of the nozzle in the consumable liquid relative to the surface level of the consumable liquid is adjusted based on the type of the consumable liquid detected by the liquid sensor.

In some embodiments, a position of the nozzle in the consumable liquid relative to the surface level of the consumable liquid is adjusted based on the volume of the consumable liquid detected by the measuring sensor and/or probe.

In some embodiments, a position of the nozzle in the consumable liquid relative to the surface level of the consumable liquid is adjusted based on a recipe.

An automated heating and/or foaming apparatus according to some embodiments of the present disclosure includes a body, a steam pipe and at least one cleaning pipe. The steam pipe is connected to the body. The steam pipe includes a nozzle configured to inject water vapor or compressed gas into a consumable liquid to heat and/or foam the consumable liquid. The cleaning pipe is connected to the body. The cleaning pipe is configured to spray water vapor, water, and/or compressed gas on the steam pipe to clean the steam pipe.

In some embodiments, the automated heating and/or foaming apparatus further includes a motor configured to move the steam pipe between a working position, from which the steam pipe injects water vapor, water or compressed gas into the consumable liquid, and a cleaning position, in which the steam pipe is cleaned.

In some embodiments, the automated heating and/or foaming apparatus further includes a switching device configured to switch a flow of the water vapor, water and/or compressed gas between the steam pipe and the cleaning pipe.

In some embodiments, the automated heating and/or foaming apparatus further includes a water tank and a compressed gas tank, wherein the water tank and the compressed gas tank are connected to the steam pipe and the at least one cleaning pipe.

In some embodiments, the at least one cleaning pipe laterally surrounds the steam pipe to spray the water vapor, water and/or compressed gas on an outer side of the steam pipe.

In some embodiments, an inner side of the steam pipe is cleaned by injecting water vapor, water and/or compressed gas into a cavity through the steam pipe.

A method for heating and/or foaming a consumable liquid according to some embodiments of the present disclosure includes the following steps: recognizing a type of a consumable liquid; detecting a surface level and/or volume of the consumable liquid; adjusting a position of a nozzle of a steam pipe in the consumable liquid relative to the surface level of the consumable liquid based on the type and/or volume of the consumable liquid and/or a recipe; and injecting water vapor or compressed gas through the nozzle of the steam pipe into the consumable liquid to heat and/or foam the consumable liquid.

In some embodiments, the method further includes: determining a target temperature of the consumable liquid according to the type of the consumable liquid, and heating the consumable liquid to the target temperature using the water vapor.

In some embodiments, the method further includes: cleaning the steam pipe by at least one cleaning pipe.

In some embodiments, the method further includes: moving the steam pipe between a working position, from which the steam pipe injects water vapor or compressed gas into the consumable liquid, and a cleaning position, in which the steam pipe is cleaned.

In some embodiments, the method further includes: switching a flow of the water vapor, water, and/or compressed gas between the steam pipe and the cleaning pipe.

An automated heating and/or foaming apparatus according to some embodiments of the present disclosure includes a body, a stage, a liquid sensor and a steam pipe. The stage is connected to the body and is configured to support a container holding a consumable liquid. The liquid sensor is connected to the body and is configured to recognize a type of the consumable liquid. The steam pipe is connected to the body. The steam pipe includes a nozzle configured to inject water vapor or compressed gas into the consumable liquid to heat and/or foam the consumable liquid.

An automated heating and/or foaming apparatus according to some embodiments of the present disclosure includes a body, a stage, a measuring sensor and a steam pipe. The stage is connected to the body and is configured to support a container holding a consumable liquid. The measuring sensor is configured to detect a surface level and/or volume of the consumable liquid. The steam pipe is connected to the body. The steam pipe includes a nozzle configured to inject water vapor or compressed gas into the consumable liquid to heat and/or foam the consumable liquid.

An automated heating and/or foaming apparatus according to some embodiments of the present disclosure includes a body, a stage, a temperature sensor and a steam pipe. The stage is connected to the body and is configured to support a container holding a consumable liquid. The temperature sensor is connected to the body and is configured to detect a temperature of the consumable liquid and/or a temperature of the container holding the consumable liquid. The steam pipe is connected to the body. The steam pipe includes a nozzle configured to inject water vapor or compressed gas into the consumable liquid to heat and/or foam the consumable liquid.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 4 is an enlarged view of FIG. 2.

DETAILED DESCRIPTION

Figure 1:
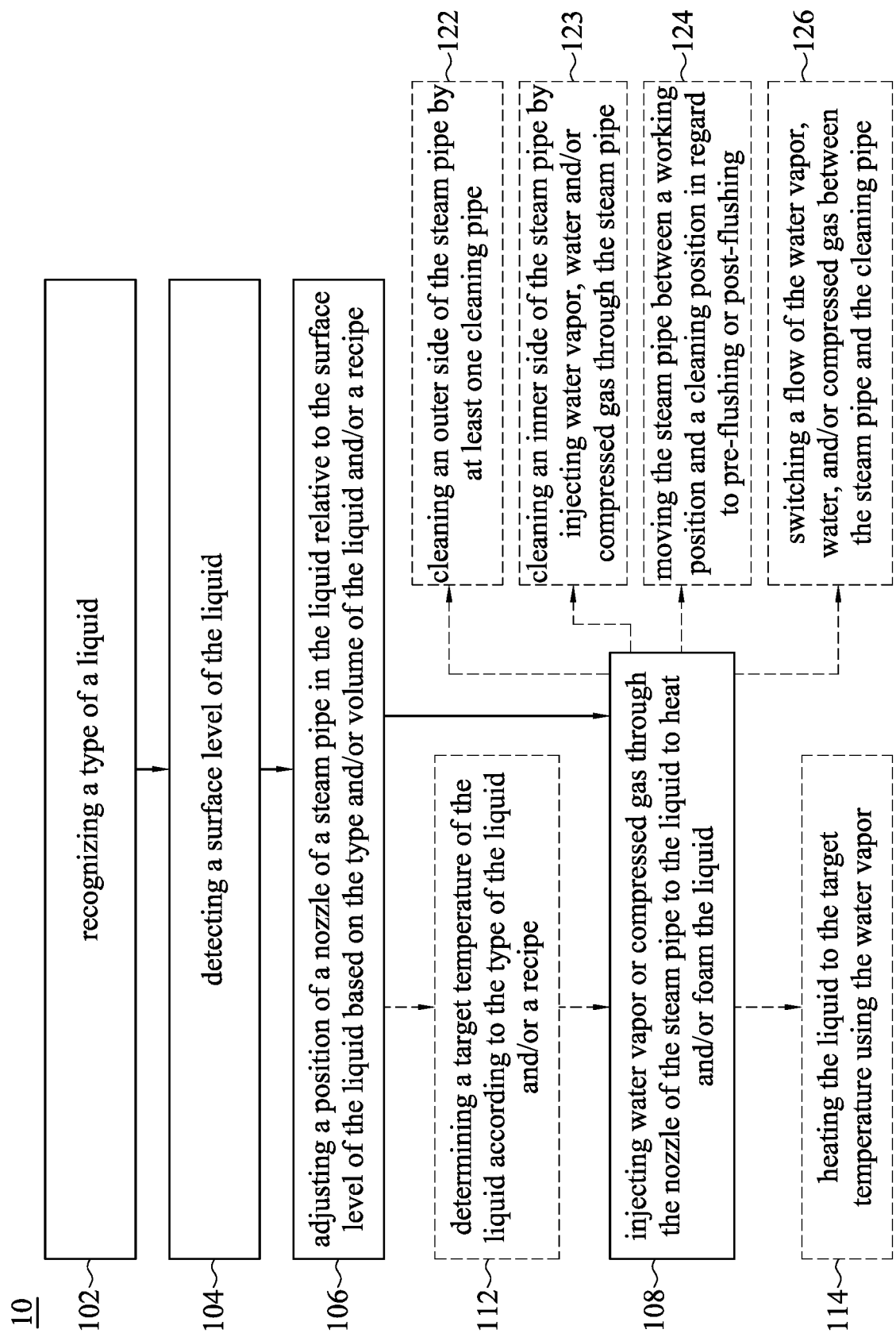
FIG. 1 is a flowchart representing a method for heating and/or foaming a consumable liquid according to aspects of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the deviation normally found in the respective testing measurements. Also, as used herein, the terms "about," "substantial" or "substantially" generally mean within 10%, 5%, 1% or 0.5% of a given value or range.

Alternatively, the terms "about," "substantial" or "substantially" mean within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "about," "substantial" or "substantially." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as being from one endpoint to another endpoint or between two endpoints. All ranges disclosed herein are inclusive of the endpoints, unless specified otherwise.

Embodiments of an automated heating and/or foaming apparatus and a method for heating and/or foaming a consumable liquid are provided. The automated heating and/or foaming apparatus includes a number of sensors. Each sensor monitors a specific property such as type, temperature or volume of the consumable liquid in order to achieve an optimal final result. When the sensors determine that the consumable liquid has the correct type, temperature and/or volume, a steam pipe is lowered into the consumable liquid. The consumable liquid is then heated and/or foamed to achieve a requested end condition. Cleaning pipes may be incorporated in the automated heating and/or foaming apparatus to assure optimal hygiene. Accordingly, quality and stability of foamed consumable liquid such as the milk foam can be achieved. Further, consistent quality of the consumable liquid and/or foam can be achieved.

FIG. 1 is a flowchart representing a method 10 for heating and/or foaming a consumable liquid according to aspects of the present disclosure. It should be understood that additional steps can be provided before, during, and after the method 10, and some of the steps described can be replaced or eliminated for other embodiments of the method. It should also be understood that the order of the operations in the method 10 can be altered according to different implementations. The method for heating and/or foaming a consumable liquid includes an operation 102, in which a type of a consumable liquid is recognized. The method 10 further includes an operation 104, in which a surface level of the consumable liquid is detected. The method 10 further includes an operation 106, in which a position of a nozzle of a steam pipe in the consumable liquid relative to the surface level of the consumable liquid is adjusted based on the type and/or volume of the consumable liquid. The method 10 further includes an operation 108, in which water vapor or compressed gas is injected from the nozzle of the steam pipe into the consumable liquid to heat and/or foam the consumable liquid.

In some embodiments, the method 10 further includes an operation 112, in which a target temperature of the consumable liquid is determined according to the type of the consumable liquid and/or recipe. In some embodiments, the operation 112 is performed prior to the operation 108. In other embodiments, the operation 112 is performed prior to the operation 104 or operation 106. In some embodiments, the method 10 further includes an operation 114, in which the consumable liquid is heated to the target temperature using the water vapor.

In some embodiments, the steam pipe is cleaned by a separate action of inside flushing and outside cleaning. In some embodiments, the method 10 further includes an operation 122, in which an outer side of the steam pipe is cleaned by at least one cleaning pipe. In some embodiments, the method 10 further includes an operation 123, in which an inner side of the steam pipe is cleaned by injecting water vapor, water and/or compressed gas through the steam pipe itself. In some embodiments, the operation 122 and/or operation 123 may be performed after the operation 108. In some embodiments, the operation 122 and/or operation 123 may be performed prior to the operation 102. In some embodiments, the method 10 further includes an operation 124, in which the steam pipe is moved between a working position and a cleaning position. In some embodiments, when the steam pipe is in the working position, the steam pipe injects water vapor or compressed gas into the consumable liquid for forming and/or heating the consumable liquid; when the steam pipe is in the cleaning position, the steam pipe is cleaned. In some embodiments, a pre-flushing may be performed before the use of the steam pipe in order to remove condensed water with water vapor, and/or a post-flushing may be performed after the use of the steam pipe in order to remove condensed water and/or residue from the treated liquid with water vapor. In some embodiments, the movement from the working position to the cleaning position is in regard to pre-flushing or post-flushing. In some embodiments, the method 10 further includes an operation 126, in which a flow of the water vapor is switched between the steam pipe and the cleaning pipe. In some embodiments, the method 10 further includes switching a flow between the water vapor and the compressed gas.

Figure 2:
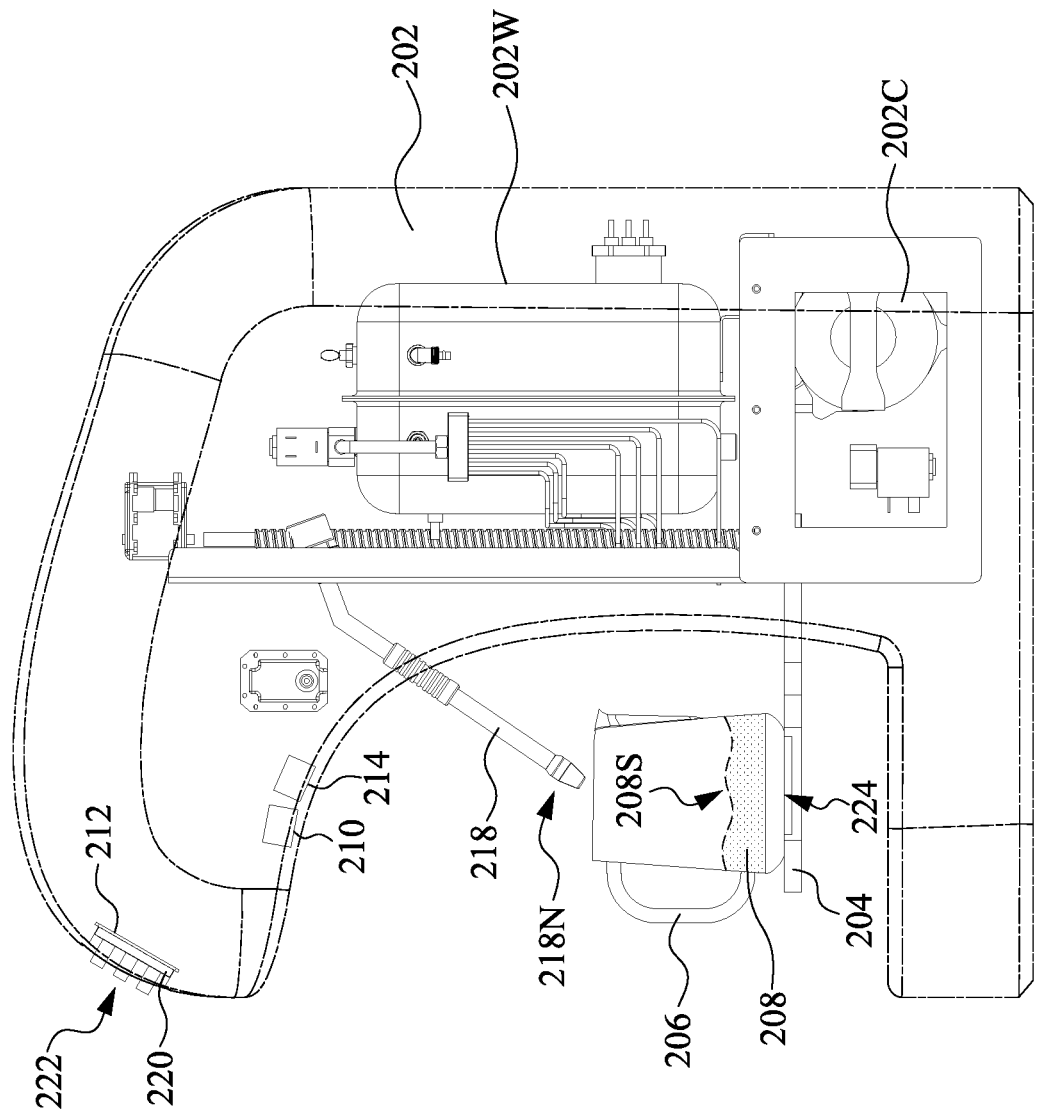
FIG. 2 is a schematic drawing illustrating an automated heating and/or foaming apparatus according to aspects of the present disclosure.

FIG. 2 is a schematic drawing illustrating an automated heating and/or foaming apparatus 20 according to aspects of the present disclosure. Referring to FIG. 2, the automated heating and/or foaming apparatus 20 includes a body 202 and a stage 204. The stage 204 is connected to the body 202. The stage 204 may be configured to support a container 206 holding a consumable liquid 208. The consumable liquid 208 may be a dairy product, a non-dairy product, juice, soup or any type of consumable liquid. Examples of the consumable liquid 208 include whole milk, skim milk, non-dairy alternatives such as soy milk, oat milk, chocolate milk and water, but the present disclosure is not limited thereto.

Referring to FIG. 2, the automated heating and/or foaming apparatus 20 further includes a liquid sensor 210 connected to the body 202. The liquid sensor 210 may be configured to recognize a type of the consumable liquid 208. The liquid sensor 210 may include a spectral analyzer. In some embodiments, the liquid sensor 210 detects a specific wavelength of the consumable liquid 208. The automated heating and/or foaming apparatus 20 may further include at least one light emitting diode (LED). A light emitted from the LED may be reflected by the consumable liquid 208 and detected by the liquid sensor 210. In some embodiments, the liquid sensor 210 is accompanied by a camera image analyzer to recognize the type of the consumable liquid 208. The automated heating and/or foaming apparatus 20 may further include a processor 212 connected to the body 202. The processor 212 may be configured to analyze the signals received by the liquid sensor 210.

Figure 3:
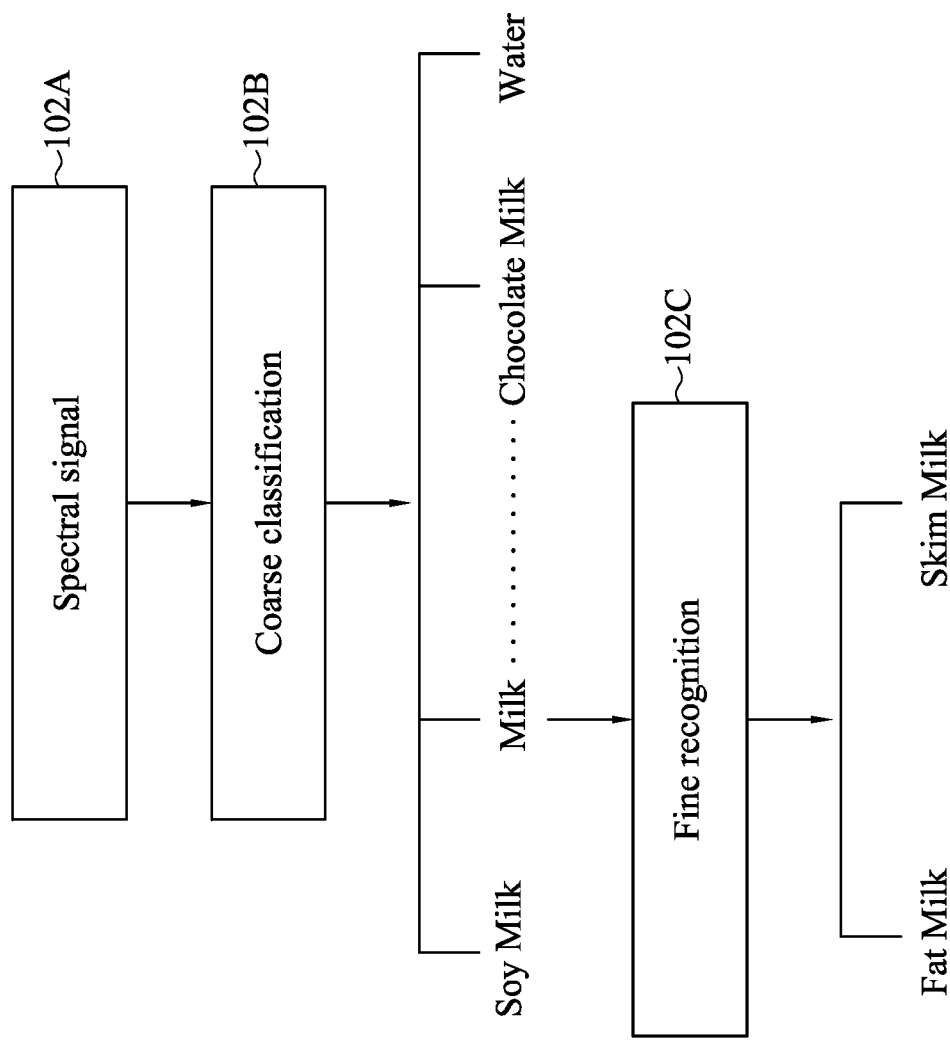
FIG. 3 is a flowchart representing recognizing a type of a consumable liquid according to aspects of the present disclosure.

The liquid sensor 210 may be configured to perform the operation 102. FIG. 3 is a flowchart representing recognizing a type of a consumable liquid according to aspects of the present disclosure. Referring to FIG. 3, the operation 102 may include a plurality of steps 102A, 102B and 102C. At step 102A, the liquid sensor 210 may receive a spectral signal from the consumable liquid 208. At step 102B, the processor 212 may broadly categorize the signals received by the liquid sensor 210. In some embodiments, the consumable liquid 208 is classified as one of soy milk, milk, chocolate milk, water, etc. At step 102C, the processor 212 may narrowly categorize the consumable liquid 208 and recognize the type of the consumable liquid 208. For example, the consumable liquid 208 may be broadly categorized as milk at step 102B, and may be narrowly categorized as either whole milk or skim milk at step 102C. It should be understood that the order of the steps 102A, 102B and 102C in the operation 102 can be altered according to different implementations.

Referring to FIG. 2 again, the automated heating and/or foaming apparatus 20 further includes a measuring sensor 214. The measuring sensor 214 may be connected to the body 202. In some embodiments, the measuring sensor 214 is disposed adjacent to the liquid sensor 210. In some embodiments, the measuring sensor 214 is disposed at the portion of the body 202 facing the consumable liquid 208. The measuring sensor 214 is configured to detect a surface level and/or volume of the consumable liquid 208. The processor 212 may be configured to analyze the signals received by the measuring sensor 214. In some embodiments, the level and/or volume of the consumable liquid 208 may be measured by the pressure.

The measuring sensor 214 may be configured to perform the operation 104. FIG. 4 is an enlarged view of FIG. 2 illustrating the measuring sensor 214 and the container 206 according to aspects of the present disclosure. Referring to FIG. 4, the measuring sensor 214 further includes a measuring sensor chip 216. The processor 212 may be configured to analyze the signals received from the measuring sensor chip 216.

In some embodiments, a volume of the consumable liquid 208 is detected and determined by the signals received by the measuring sensor 214. In some embodiments, the measuring sensor 214 may be configured to detect the volume of the consumable liquid 208 by sensing the level difference between the liquid surface 208S of the consumable liquid 208 and the top surface 206T of the container 206. For example, the measuring sensor chip 216 receives a signal of the level of the liquid surface 208S of the consumable liquid 208 and a signal of the top surface 206T of the container 206. The signals are then transmitted to the processor 212. The processor 212 may calculate the level difference between the liquid surface 208S of the consumable liquid 208 and the top surface 206T of the container 206 and determine the volume of the consumable liquid 208. In some embodiments, the volume of the consumable liquid 208 is detected by the measuring sensor 214 and determined by the processor 212 based on the level difference between the liquid surface 208S of the consumable liquid 208 and the bottom surface 206B of the container 206.

Referring to FIG. 2 again, the automated heating and/or foaming apparatus 20 further includes a steam pipe 218. The steam pipe 218 is connected to the body 202. The steam pipe 218 may include a nozzle 218N configured to inject water vapor and/or compressed gas into the consumable liquid 208 to heat and/or foam the consumable liquid 208. In some embodiments, a position of the nozzle 218N in the consumable liquid 208 relative to the surface level of the consumable liquid 208 is adjusted based on the type and/or volume of the consumable liquid 208 and/or a recipe according to operation 106. The position of the nozzle 218N in the consumable liquid 208 relative to the surface level of the consumable liquid 208 may influence an amount of foam generated. For example, if the nozzle 218N is only slightly submerged in the consumable liquid 208, a greater amount of the foam may be formed. In contrast, if the nozzle 218N is deeply submerged in the consumable liquid 208, a smaller amount or no amount of the foam may be formed. The position of the nozzle 218N in the consumable liquid 208 relative to the surface level of the consumable liquid 208 is related to the amount of foam that can be produced. The automated heating and/or foaming apparatus 20 may include more than one steam pipes 218. Depending on design requirements, different number of steam pipes 218 may be adopted for different devices.

In some embodiments, the stage 204 is a moving stage. The stage 204 may be configured to adjust the position of the surface level of the consumable liquid 208 relative to the nozzle 218N. For example, if the stage 204 raises the container 206, the nozzle 218N will be deeply submerged in the consumable liquid 208. In contrast, if the stage 204 lowers the container 206, the nozzle 218N will be only slightly submerged in the consumable liquid 208. In some embodiments, the steam pipe 218 is a moving element. The steam pipe 218 may be configured to adjust the position of the nozzle 218N within the consumable liquid 208.

In some embodiments, the relative positions of the nozzle 218N and the surface level of the consumable liquid 208 may be adjusted according to the amount of foam chosen by a user. In some embodiments, the automated heating and/or foaming apparatus 20 further includes a display panel 220 and a plurality of functional buttons 222. The display panel 220 may indicate the type of the consumable liquid 208 detected by the liquid sensor 210 and shows a suggested amount of foam according to the type of the consumable liquid 208. In some embodiments, the amount of foam may be decided according to the user's preference. For example, the functional buttons 222 may represent different parameters such as no foam, small amount of foam, or large amount of foam. In some embodiments, according to the preferred end condition, e.g., more or less foam, the nozzle 218N of the steam pipe 218 will be moved to a position more or less deep in the consumable liquid 208 by raising or lowering the container 206 or steam pipe 218 accordingly.

After the relative positions of the nozzle 218N and the surface level of the consumable liquid 208 are adjusted, water vapor or compressed gas is injected through the nozzle 218N of the steam pipe 218 into the consumable liquid 208 to heat and/or foam the consumable liquid 208 according to operation 108. In some embodiments, the steam pipe 218 is connected to a water tank 202W and a compressed gas tank 202C of the body 202. In some embodiments, the steam pipe 218 is connected to the water tank 202W and the compressed gas tank 202C through a plurality of valves and pipes. The water in the water tank 202W may be heated to the boiling point of the water to generate the water vapor. The gas in the compressed gas tank 202C may be compressed to generate the compressed gas. The water vapor or the compressed gas passes through the steam pipe 218 and is injected into the consumable liquid 208 by the nozzle 218N of the steam pipe 218. In some embodiments, the automated heating and/or foaming apparatus 20 further includes a switch for switching between the water vapor, the water and the compressed gas. In some embodiments, the water vapor and/or water are designed for hot preparation of the liquid, and the compressed gas is designed for cold preparation of the foam.

In some embodiments, the automated heating and/or foaming apparatus 20 further includes a control unit configured to control the steam. Different properties of the steam, e.g., drier, stronger, or more stable steam, are used in setting stable and effective parameters and therefore controllable results. By controlling, e.g., the boiler temperature and amount of water within the water tank 202W, a different quality of the steam may be generated. The controlling of the steam allows for control of the final result of the treated consumable liquid 208. In some embodiments, the method of the automated heating and/or foaming apparatus 20 further includes setting the pressure within the boiler and controlling the valves to generate hotter and stronger steam. Hotter and stronger steam helps the consumable liquid 208 reach the target temperature faster.

In some embodiments, a turbulence (or other kind of liquid movement) may be generated in the container 206 by controlling the amount, direction, position and strength of the water vapor or compressed gas delivered into the consumable liquid 208. By controlling the movement of the liquid, an optimal result can be achieved. The shape and size of the nozzle 218N of the steam pipe 218 help control the movement of the consumable liquid 208. The nozzle 218N of the steam pipe 218 may have different shapes or sizes according to different implementations. In some embodiments, the nozzle 218N of the steam pipe 218 may have a slit-hole or three holes.

In some embodiments, the volume of the consumable liquid 208 in the container 206 has a minimum volume (e.g., 125 ml) and a maximum volume (e.g., 500 ml) according to the size of the container 206. The minimum volume and the maximum volume are required so that the consumable liquid 208 can be treated or foamed in accordance with the correct volume. The amount of water vapor or compressed gas from the steam pipe 218 (e.g., by using different valves or other methods) can be adjusted in order to change the volume of consumable liquid 208. In some embodiments, when a volume of consumable liquid 208 in the container 206 is insufficient, the power of the water vapor or compressed gas is excessive. Thus, a controlled liquid treatment and a controlled/qualitative end condition of the desired final temperature and/or foam may not be obtained. In some embodiments, when a volume of the consumable liquid 208 in the container 206 is excessive, heating and/or foaming the consumable liquid 208 will result in an increase in the volume of the consumable liquid 208 and cause the container 206 to overflow, thus spilling the consumable liquid 208. The power of the water vapor or compressed gas may be specifically controlled (e.g., by using different valves or other method) in order to optimize workability and accepted limits.

Additionally or optionally, the automated heating and/or foaming apparatus 20 may further include a temperature sensor 224. The temperature sensor 224 is connected to the body 202. In some embodiments, the temperature sensor 224 is disposed on the surface of the stage 204. In some embodiments, the temperature sensor 224 is disposed adjacent to the liquid sensor 210 and the measuring sensor 214. In some embodiments, the temperature sensor 224 may be placed in such a way that it's facing the container 206 in order to measure it. In some embodiments, the temperature from the container 206 is detected by the temperature sensor 224 instead of from the consumable liquid 208.

The temperature sensor 224 may be configured to detect a temperature of the consumable liquid 208 and/or a temperature of the container 206 holding the consumable liquid 208. In some embodiments, the temperature sensor 224 is configured to detect an initial temperature of the consumable liquid 208. The initial temperature of the consumable liquid 208 is defined as the temperature of the consumable liquid 208 at a starting time immediately after the consumable liquid 208 has been disposed in the container 206 or immediately after the container 206 holding the consumable liquid 208 has been placed on the stage 204. The initial temperature of the consumable liquid 208 may be detected before performing the operations 102, 104 or 106. The initial temperature of the consumable liquid 208 may be related to the end condition of the treatment. In some embodiments, the end condition of the foam or the final quality of the product can be improved by starting with a low initial temperature. In some embodiments, a lower initial temperature of the consumable liquid 208 leads to a better taste and greater smoothness of the consumable liquid 208 and/or the foam.

In some embodiments, according to operation 112, a target temperature of the consumable liquid 208 and/or the container 206 holding the consumable liquid 208 is determined according to the type of the consumable liquid 208. After the target temperature of the consumable liquid 208 is determined, the water vapor is injected into the consumable liquid 208 by the nozzle 218N of the steam pipe 218. In some embodiments, according to operation 114, the consumable liquid 208 is heated to the target temperature using the water vapor. In some embodiments, once the target temperature is reached, the steam pipe 218 stops injecting the water vapor. In some embodiments, the target temperature of the consumable liquid 208 and/or the container 206 holding the consumable liquid 208 is monitored by the temperature sensor 224. In some embodiments, the temperature sensor 224 monitors the change in the temperature of the consumable liquid 208 and/or the change in the temperature of the container 206 holding the consumable liquid 208 throughout the heating process.

In some embodiments, different consumable liquids require different optimal target temperatures at the end of the heating and/or foaming process. For example, soup must be heated to a temperature significantly greater than the target temperature used for latte or cappuccino. In some embodiments, dairy liquids can be heated to a greater temperature and still remain tastier than some non-dairy ingredients. In some embodiments, the consumable liquid 208 is required to be cold and will be treated by compressed gas.

In some embodiments, the target temperature may be chosen by a user. In some embodiments, the display panel 220 may indicate the type of the consumable liquid 208 detected by the liquid sensor 210 and may show a suggested target temperature of the consumable liquid 208 according to the type of the consumable liquid 208. In some embodiments, the suggested target temperature is an average target temperature that is used to determine when to stop the action of foaming/heating. In some embodiments, the target temperature may be decided according to the user's preference. For example, the functional buttons 222 may represent different standard options, such as 60 degrees Celsius for a "to go" cup, 70 degrees Celsius for a "nice and warm" latte, 80 degrees Celsius for a "hot chocolate" drink and 90 degrees Celsius for a "soup." In some embodiments, the action of treating the consumable liquid 208 is stopped when the chosen target temperature has been obtained. In some embodiment, a user, such as a chef, may set his/her own recipes and personally choose temperature and/or desired amount of foam.

In some embodiments, the consumable liquid 208 may be preheated before being deposited into the container 206. The temperature of the preheated consumable liquid 208 is detected by the temperature sensor 224. If the temperature of the preheated consumable liquid 208 is greater than a predetermined value, the display panel 220 may display a message that the preheated consumable liquid 208 should be cooled to a suitable temperature. In some embodiments, a minimum temperature is set as a temperature needed before the automated heating and/or foaming apparatus 20 can start functioning.

In some embodiments, a level measurement and/or temperature measurement of the consumable liquid 208 is performed by contacting the consumable liquid 208 with a probe. In some embodiments, the probe may be a temperature probe, such as the temperature sensor 224. The automated heating and/or foaming apparatus 20 may read the data from the temperature probe when it contacts the consumable liquid 208 and/or the container 206, and uses the data to identify the level and/or temperature. An additional probe may perform a double check by repeating steps of measuring and determining the level of the consumable liquid 208.

In some embodiments, the data from the sensors, such as the liquid sensor 210, the measuring sensor 214 and/or the temperature sensor 224, is obtained and used in calculations performed to decide the appropriate action to be taken. The nozzle 218N of the steam pipe 218 is submerged below the liquid surface 208S of the consumable liquid 208 by raising the container 206 toward the nozzle 218N. In some embodiments, the nozzle 218N may be lowered toward the container 206 and the liquid surface 208S of the consumable liquid 208 to be submerged to the desired level.

Figure 5A:
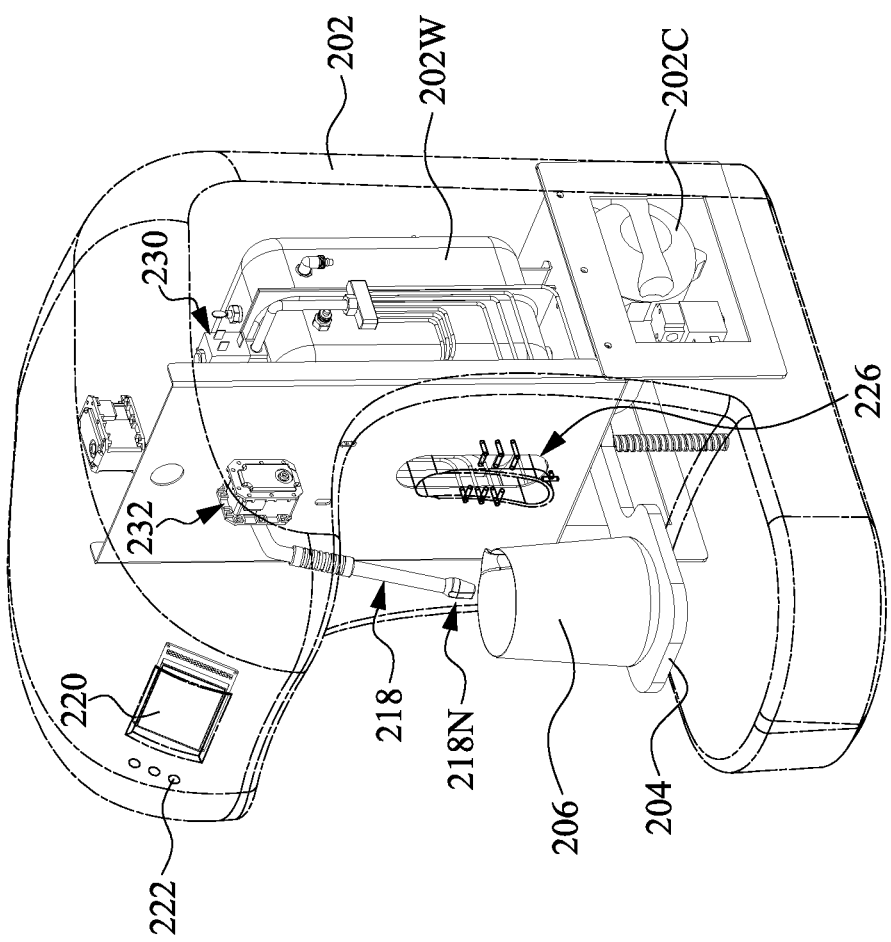
FIGS. 5A-5B are schematic drawings illustrating an automated heating and/or foaming apparatus in different states according to aspects of the present disclosure.
Figure 5B:
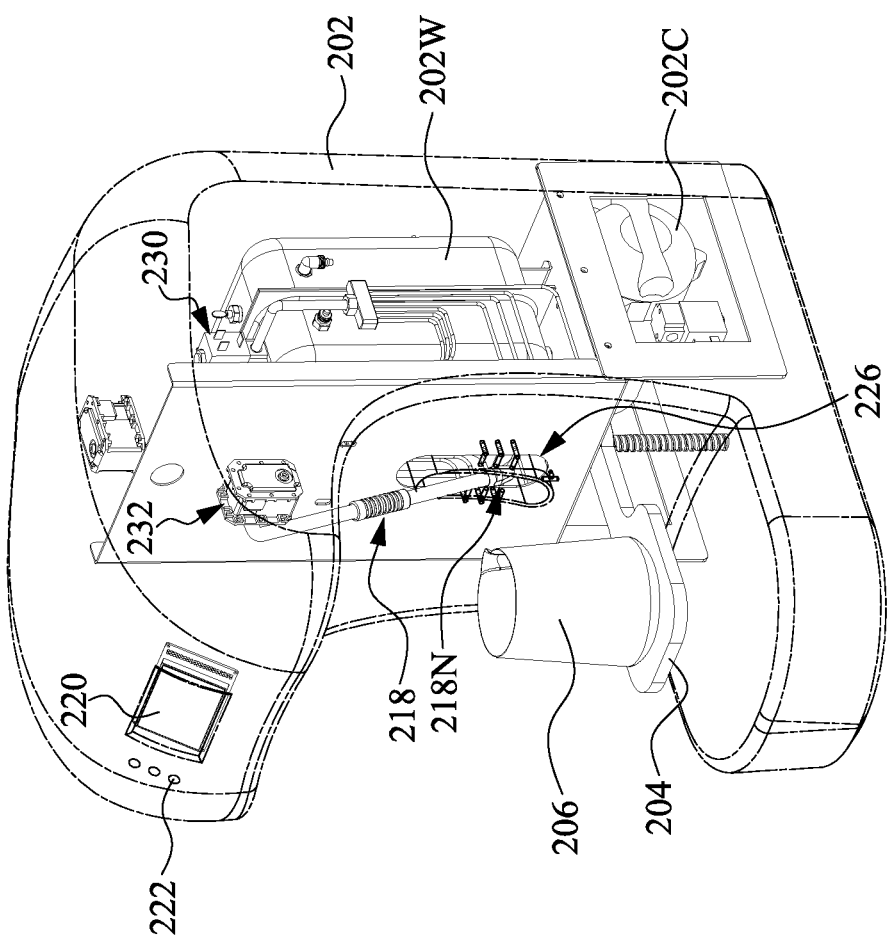

FIGS. 5A and 5B are schematic drawings illustrating the automated heating and/or foaming apparatus 20 in different states according to aspects of the present disclosure. For the sake of clarity, only a portion of the features of the automated heating and/or foaming apparatus 20 are illustrated in FIGS. 5A and 5B, and descriptions of some features are omitted from this discussion for brevity.

Referring to FIG. 5A, the steam pipe 218 is at a working position, from which the steam pipe 218 injects water vapor or compressed gas into the consumable liquid 208. Referring to FIG. 5B, the steam pipe 218 is at a cleaning position, at which the steam pipe 218 is cleaned. In some embodiments, to assure hygiene and optimal maintenance of the automated heating and/or foaming apparatus 20, the automated heating and/or foaming apparatus 20 further includes an auto-clean cavity 226 for automatic cleaning of the steam pipe 218 before and/or after the consumable liquid 208 is foamed. In some embodiments, an alarm signal may be displayed on the display panel 220 if the steam pipe 218 is not clean. In some embodiments, the automated heating and/or foaming apparatus 20 may prevent the steam pipe 218 from operating if it hasn't been cleaned.

Figure 5C:
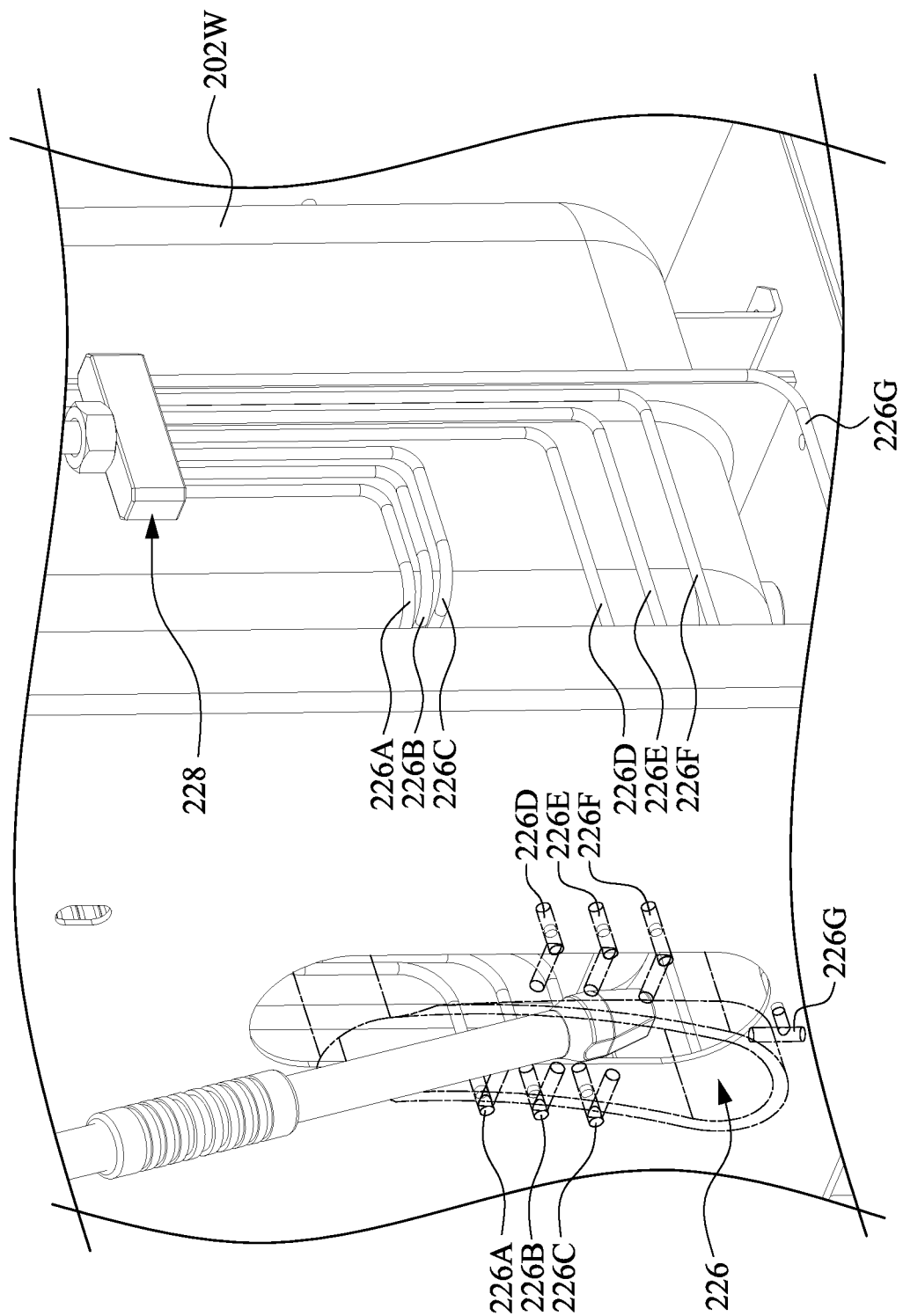
FIG. 5C is an enlarged view of FIG. 5B.

FIG. 5C is an enlarged view of FIG. 5B. Referring to FIG. 5C, the automated heating and/or foaming apparatus 20 further includes cleaning pipes 226A, 226B, 226C, 226D, 226E, 226F and 226G. The cleaning pipes 226A to 226G are disposed in the auto-clean cavity 226. The cleaning pipes 226A to 226G may be connected to the water tank 202W. The cleaning pipes 226A to 226G may be configured to perform the operation 122. The cleaning pipes 226A to 226G may be configured to clean the steam pipe 218. The cleaning pipes 226A, 226B, 226C, 226D, 226E and 226F laterally surround the steam pipe 218 to spray the water vapor, water and/or compressed gas on an outer side of the steam pipe 218. An outlet of the cleaning pipe 226G may be aligned with the nozzle 218N of the steam pipe 218 to spray water vapor, water and/or compressed gas on the top of the steam pipe 218. An inner side of the steam pipe 218 is cleaned by injecting water vapor, water and/or compressed gas into the auto-clean cavity 226 through the steam pipe 218. In some embodiments, the inner side of the steam pipe 218 is cleaned by injecting short pulses of steam through the steam pipe 218. In some embodiments, the cleaning pipes 226A to 226G spray the water vapor when the steam pipe 218 is in the auto-clean cavity. The number of cleaning pipes 226A to 226G shown in FIGS. 5A to 5C are for illustrative purposes only. Other numbers of cleaning pipes and configurations of the automated heating and/or foaming apparatus are within the contemplated scope of the present disclosure.

In some embodiments, the automated heating and/or foaming apparatus 20 further includes a switching device 228. The switching device 228 may be configured to perform the operation 126. The switching device 228 may be configured to switch a flow of the water vapor between the steam pipe 218 and the cleaning pipes 226A to 226F. For example, when the steam pipe 218 is at the working position, the switching device 228 starts the flow of the water vapor in the steam pipe 218 and stops the flow of the water vapor in the cleaning pipes 226A to 226G. When the steam pipe 218 is at the cleaning position, the switching device 228 starts the flow of the water vapor in the cleaning pipes 226A to 226G and stops the flow of the water vapor in the steam pipe 218. In some embodiments, the switching device 228 is configured to switch a flow of the water vapor between the cleaning pipes 226A to 226F. For example, the switching device 228 may start the flow of the water vapor in the cleaning pipes 226A to 226F and stop the flow of the water vapor in the cleaning pipe 226G. In some embodiments, the switching device 228 may not open the cleaning pipes 226A to 226F at the same time. For example, the switching device 228 may open the cleaning pipes 226A and 226D at the beginning of the cleaning process, open the cleaning pipes 226B and 226F in the middle of the cleaning process, and open the cleaning pipes 226C and 226F near the end of the cleaning process.

Referring to FIGS. 5A and 5B again, the automated heating and/or foaming apparatus 20 may further include a valve 230. In some embodiments, the cleaning pipes 226A to 226F are connected to the water tank 202W by the valve 230. In some embodiments, the valve 230 may be configured to control an amount of water vapor passing through the cleaning pipes 226A to 226F. In some embodiments, the valve 230 may be configured to control an amount of water vapor passing through the steam pipe 218. In some embodiments, the valve 230 controls the amount of the water vapor or compressed gas delivered to the consumable liquid 208 through the steam pipe 218. For example, less water vapor or compressed gas is needed to heat and/or foam consumable liquid 208 with smaller volume and more water vapor and/or compressed gas is needed to heat and/or foam consumable liquid 208 having larger volume. The valve 230 may be controlled according to different parameters of the consumable liquid 208. In some embodiments, the valve 230 may be configured to perform the operation 126. The valve 230 may be configured to switch a flow of the water vapor between the steam pipe 218 and the cleaning pipes 226A to 226F.

Referring to FIGS. 5A and 5B again, the automated heating and/or foaming apparatus 20 may further include a motor 232. In some embodiments, the motor 232 may be configured to perform the operation 124. The motor 232 may be configured to move the steam pipe 218 between the working position, from which the steam pipe 218 injects water vapor or compressed gas into the consumable liquid 208, and the cleaning position, in which the steam pipe 218 is cleaned. In some embodiments, the motor 232 may be configured to adjust the position of the nozzle 218N relative to the surface level of the consumable liquid 208.

In some embodiments, the automated heating and/or foaming apparatus 20 may be designed to have a pre-flush function and/or a post-flush function. When the automated heating and/or foaming apparatus 20 is not in use, condensed water in the water tank 202W, the valves or the pipes (such as the steam pipe 218 or the cleaning pipes 226A to 226G) tends to accumulate in the water tank 202W or the pipes 226A to 226G. A pre-flushing may be performed prior to the automated heating and/or foaming apparatus 20 starting to heat or foam the consumable liquid 208. A post-flushing may be performed subsequent to the consumable liquid 208 is heated and/or foamed. In some embodiments, the pre-flushing and/or the post-flushing are performed within the automated heating and/or foaming apparatus 20 to avoid water vapor being randomly expelled.

In some embodiments, the automated heating and/or foaming apparatus 20 further includes a data connection function. The automated heating and/or foaming apparatus 20 may connect to an electronic device such as a smartphone, a tablet, or a server, but the present disclosure is not limited thereto. The automated heating and/or foaming apparatus 20 connects the electronic device to collect, adjust and/or input data and settings. In some embodiments, an application of the smartphone may be linked to the automated heating and/or foaming apparatus 20. The application of the smartphone may control the parameters, such as the target temperature or the amount of desired foam, for heating and/or foaming the consumable liquid 208.

In some embodiments, the automated heating and/or foaming apparatus 20 further includes a data gathering function. In some embodiments, the data may be gathered for analyzing the performance of the automated heating and/or foaming apparatus 20. In some embodiments, the data may be gathered for use by a user to analyze his or her customer's consumption habits. In some embodiments, the data may be gathered for franchise locations of a multinational company to optimize volumes, inventories and sales, and to use such data in setting parameters such as amount of foam specific to customers' preferences, desired temperature of served beverages, or to adjust a volume of liquid during changing of cups or other elements. In some embodiments, the data may be gathered for developing IoT or other means to connect the user to vendors of ingredients or technicians, or to provide the user with videos or recipes. In some embodiments, the data may be gathered for sales of data to those wishing to analyze market data or tailor products according to market behavior within regions, countries or target groups.

Figure 6:
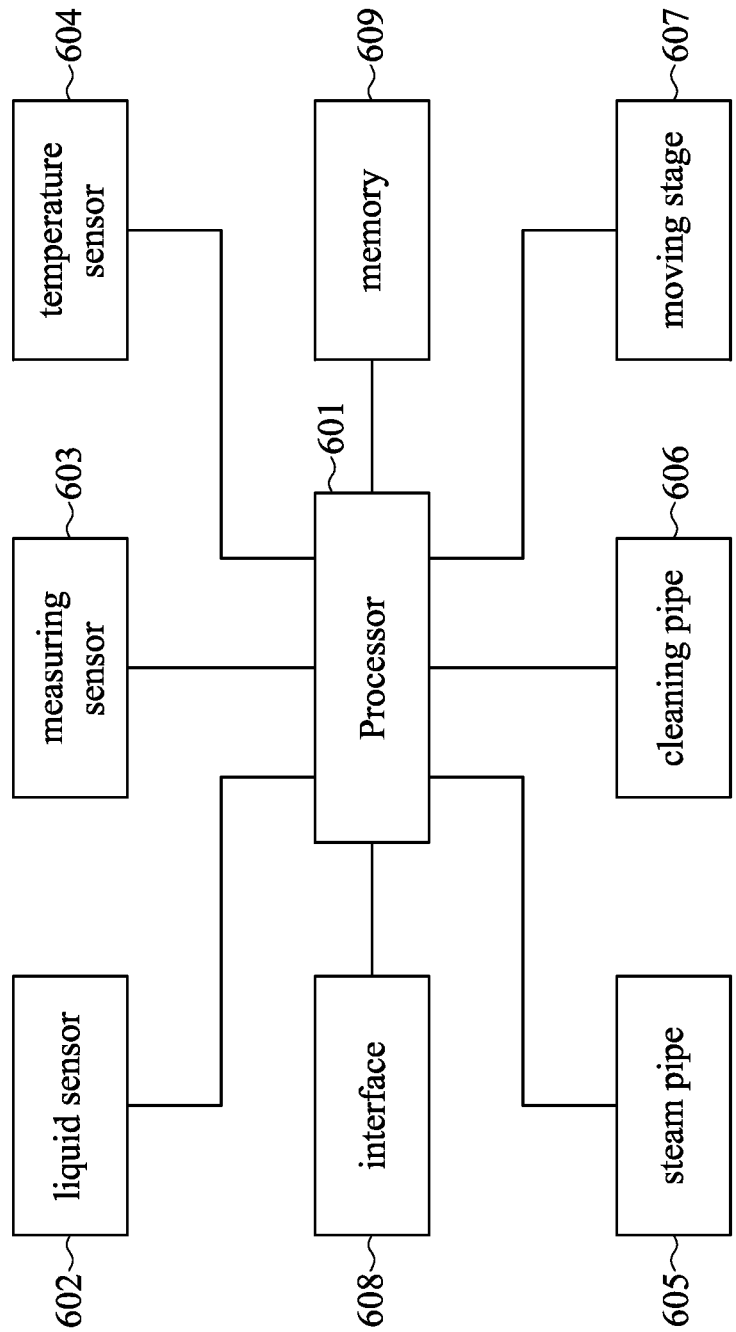
FIG. 6 is a schematic and diagrammatic view of the automated heating and/or foaming apparatus illustrated in FIGS. 2, 5A and 5B.

FIG. 6 is a schematic and diagrammatic view of an automated heating and/or foaming system 60 of the automated heating and/or foaming apparatus 20 illustrated in FIGS. 2, 5A and 5B. The automated heating and/or foaming system 60 is configured to heat and/or foam a consumable liquid using a plurality of entities, such as a processor 601, a liquid sensor 602, a measuring sensor 603, a temperature sensor 604, a steam pipe 605, a cleaning pipe 606, a moving stage 607, an interface 608 and a memory 609. The entities in the automated heating and/or foaming system 60 may be linked by a communication channel, e.g., a wired or wireless channel, and interact with one another through a network, e.g., an intranet or the internet. In some embodiments, the liquid sensor 602, the measuring sensor 603 and the temperature sensor 604 belong to a single entity, or are operated by independent parties. In some embodiments, a bus line couples the processor 601, the liquid sensor 602, the measuring sensor 603, the temperature sensor 604, the steam pipe 605, the cleaning pipe 606, the moving stage 607, the interface 608 and the memory 609 to each other. In some embodiments, the steam pipe 605 is a movable steam pipe. The automated heating and/or foaming system 60 further include a dosing unit configured to automatically dose the consumable liquid into the container. For example, the consumable liquid to be heated and/or foamed may be delivered directly from the fridge to the container with a pump.

The processor 601 is configured to execute program instructions that include a tool configured for heating and/or foaming different beverages with different amounts of foam and temperatures as described and illustrated with reference to figures of the present disclosure.

The liquid sensor 602 is configured to recognize the type of consumable liquid as described and illustrated with reference to figures of the present disclosure. The measuring sensor 603 is configured to detect a surface level of the consumable liquid as described and illustrated with reference to figures of the present disclosure. The temperature sensor 604 is configured to detect a temperature of the consumable liquid as described and illustrated with reference to figures of the present disclosure. In some embodiments, other sensor such as a contact sensor may be configured to detect an amount of the consumable liquid.

The steam pipe 605 is configured to inject water vapor or compressed gas into the consumable liquid to heat and/or foam the consumable liquid as described and illustrated with reference to figures of the present disclosure. The cleaning pipe 606 is configured to spray water vapor, water and/or compressed air on the steam pipe to clean the steam pipe as described and illustrated with reference to figures of the present disclosure. The moving stage 607 is configured to adjust the position of the surface level of the consumable liquid relative to the nozzle as described and illustrated with reference to figures of the present disclosure.

The interface 608 is configured to access program instructions and data used by the program instructions stored in the memory 609. In some embodiments, the interface 608 may be an internet interface configured to access program instructions and data used by the program instructions stored remotely through a network (not shown).

The memory 609 is configured to store program instructions to be executed by the processor 601 and data used by the program instructions. In some embodiments, the memory 609 includes any combination of a random access memory (RAM), some other volatile storage device, a read-only memory (ROM), and some other non-volatile storage device.

In some embodiments, the automated heating and/or foaming system 60 may further include an I/O device (not shown). The I/O device may include an input device and an output device configured for enabling user interaction with the automated heating and/or foaming system 60. In some embodiments, the input device includes, for example, a button, a display panel, and other devices. Moreover, the output device includes, for example, a display panel and other devices.

In some embodiments, the automated heating and/or foaming system 60 may further include a storage device (not shown). The storage device may be configured for storing the formulas for heating and/or foaming different consumable liquids, program instructions and data used by the program instructions. In some embodiments, the storage device includes a non-transitory computer-readable storage medium, for example, a magnetic disk and an optical disk.

The present disclosure provides an automated heating and/or foaming apparatus, configured to recognize different consumable liquids using sensors and to treat, heat, and/or foam the consumable liquids. The sensors are configured to determine type, temperature and volume of the consumable liquids. Operations of treating, heating and foaming processes are started, stopped or paused based on received data. With the correct type, temperature and/or volume, a steam pipe is lowered into the consumable liquid. The consumable liquid is then heated and/or foamed to the requested end condition (i.e., chosen temperature and/or amount of foam). Cleaning pipes or warning systems are incorporated in the automated heating and/or foaming apparatus to assure optimal hygiene after each use of the automated heating and/or foaming apparatus.

The structures and methods of the present disclosure are not limited to the above-mentioned embodiments, and may have other different embodiments. To simplify the description and for the convenience of comparison between each of the embodiments of the present disclosure, the identical components in each of the following embodiments are marked with identical numerals. For making it easier to compare the difference between the embodiments, the following description will detail the dissimilarities among different embodiments and the identical features will not be redundantly described.

Figure 7A:
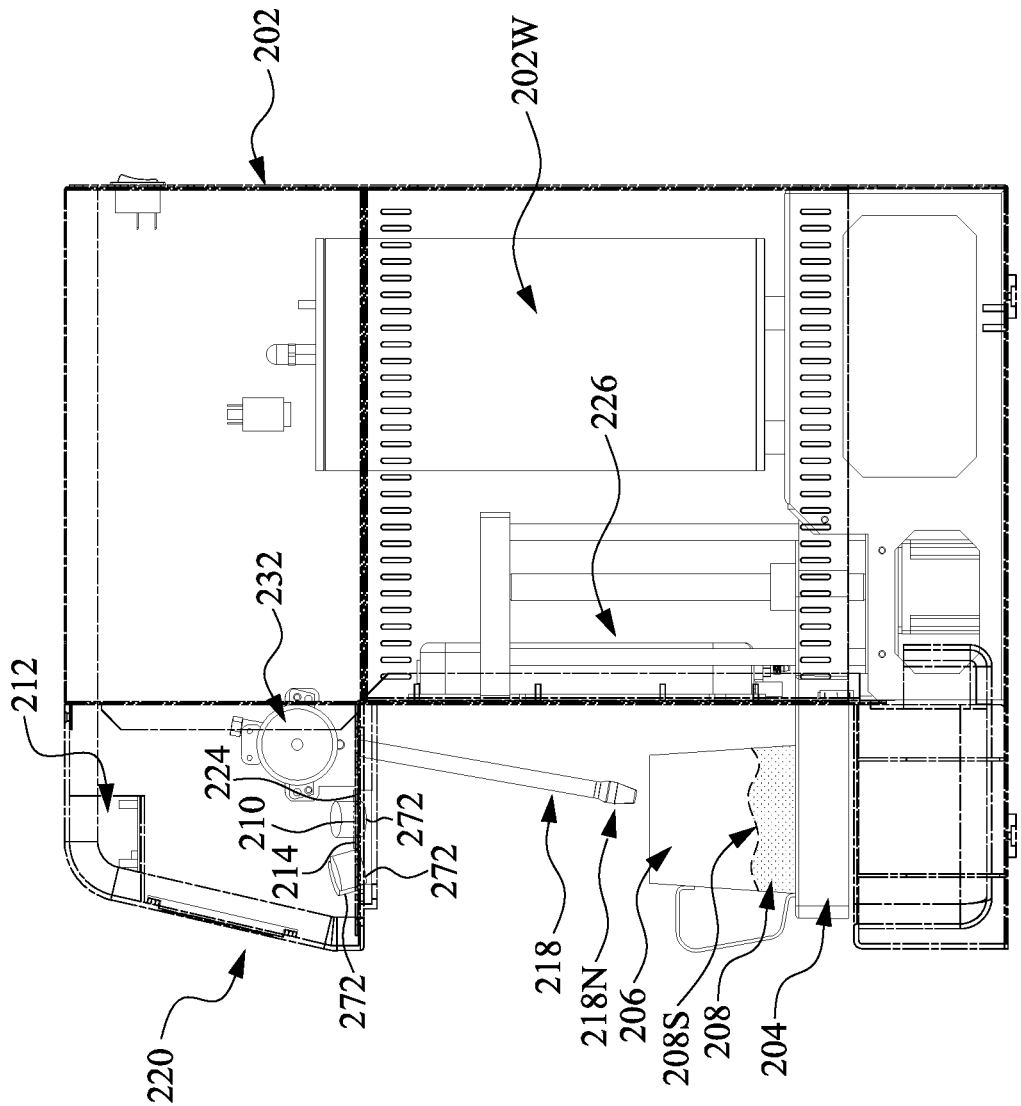
FIG. 7A is a schematic drawing illustrating an automated heating and/or foaming apparatus according to aspects of the present disclosure.
Figure 7B:
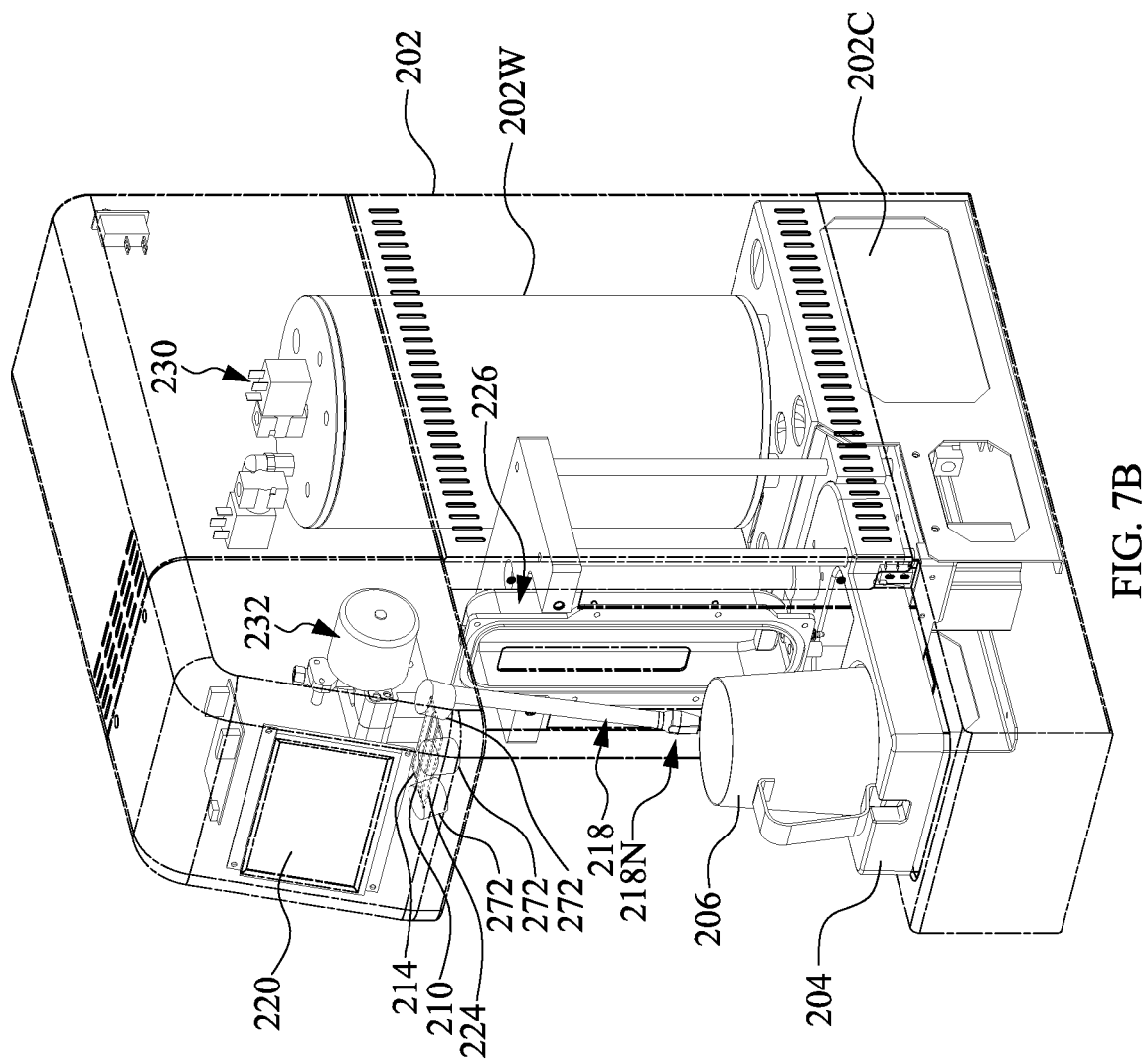
FIGS. 7B and 7D are schematic drawings illustrating an automated heating and/or foaming apparatus in different states according to aspects of the present disclosure.
Figure 7C:
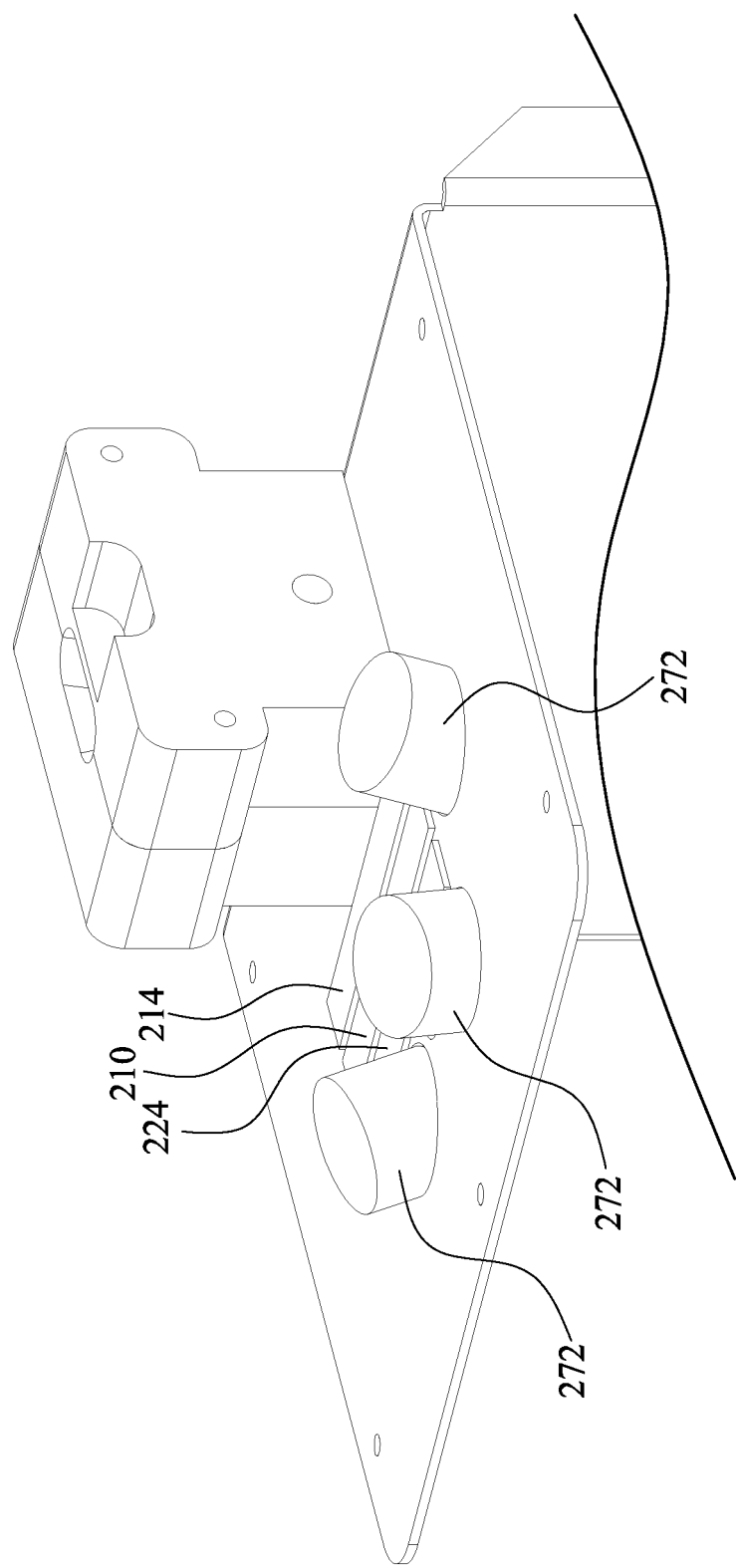
FIG. 7C is an enlarged view of FIG. 7B.
Figure 7D:
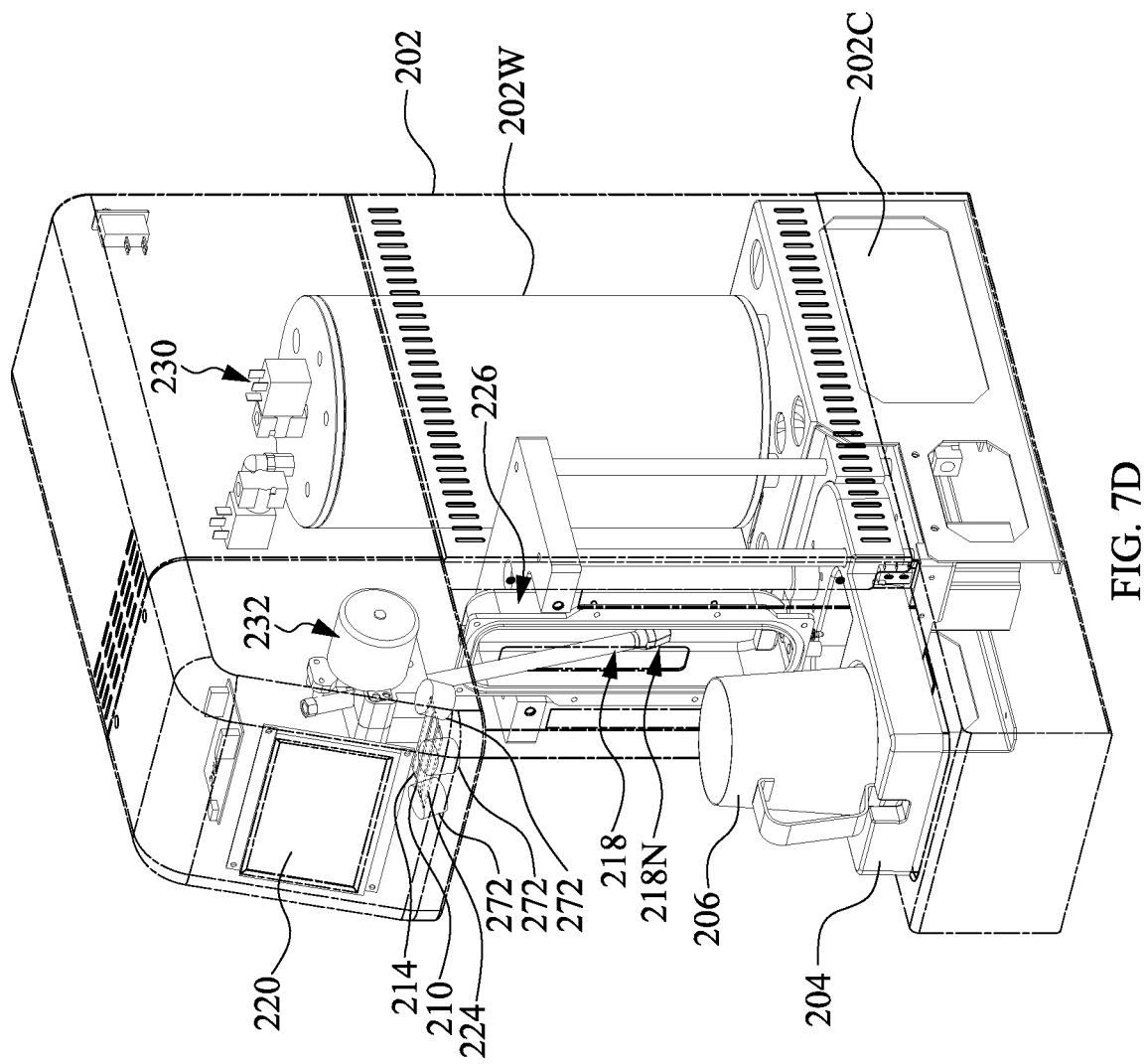
Figure 7E:
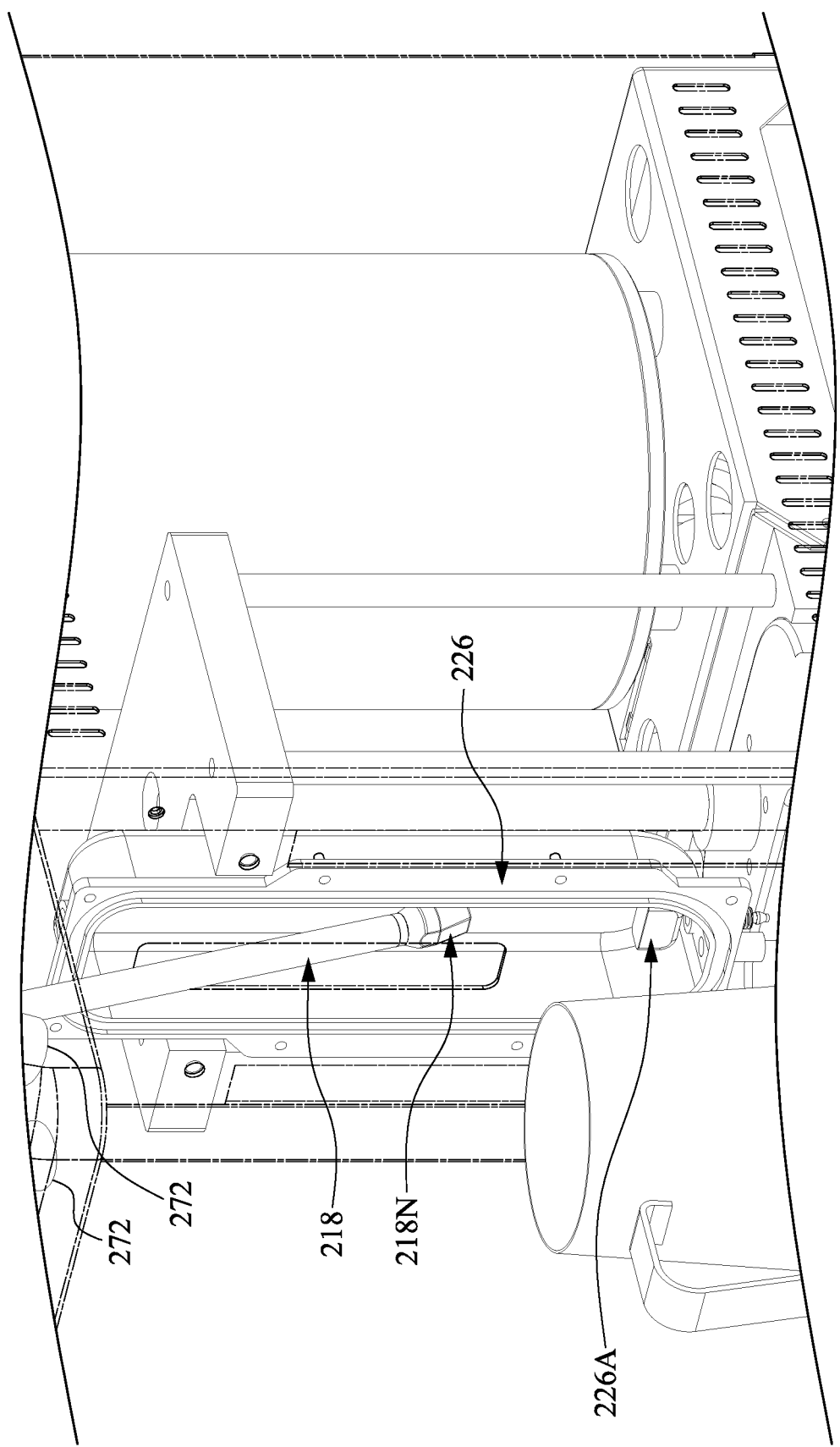
FIG. 7E is an enlarged view of FIG. 7D.

FIG. 7A is a schematic drawing illustrating an automated heating and/or foaming apparatus 70 according to aspects of the present disclosure. FIGS. 7B and 7D are schematic drawings illustrating the automated heating and/or foaming apparatus 70 in different states according to aspects of the present disclosure. FIG. 7C is an enlarged view of FIG. 7B and FIG. 7E is an enlarged view of FIG. 7D. Many aspects of the automated heating and/or foaming apparatus 70 are similar to those of the automated heating and/or foaming apparatus 20, and are hereby omitted from discussion for brevity.

Referring to FIGS. 7A to 7C, the temperature sensor 224 may be placed next to the liquid sensor 210 and the measuring sensor 214. In some embodiments, the temperature sensor 224 may be an optical sensor. In some embodiments, the automated heating and/or foaming apparatus 70 may have at least two temperature sensors 224. One of the two temperature sensor 224 may be placed near the top of the body 202 and another one of the two temperature sensor 224 may be placed near the bottom of the body. For example, one temperature sensor such as the temperature sensor 224 shown in FIGS. 7B-7C is placed adjacent to the liquid sensor 210 and the measuring sensor 214, and one temperature sensor such as the temperature sensor 224 shown in FIG. 2 is placed on the surface of the stage 204.

Referring to FIG. 7C, the automated heating and/or foaming apparatus 70 may further include one or more light emitting units 272 configured to emit light to the consumable liquid 208. The light emitting units 272 may be disposed adjacent to the liquid sensor 210. Lights emitted from the light emitting units 272 may be reflected by the consumable liquid 208 and detected by the liquid sensor 210. In some embodiments, the light emitting units 272 may be configured to emit different colors. For example, the light emitting units 272 may include a red light emitting unit, a green light emitting unit and a blue light emitting unit.

Referring to FIGS. 7D and 7E, the configuration of the auto-clean cavity 226 of the automated heating and/or foaming apparatus 70 is different from the configuration of the auto-clean cavity 226 of the automated heating and/or foaming apparatus 20. The auto-clean cavity 226 may include one cleaning pipe 226a only. The cleaning pipe 226a may further include a number of holes. For example, the cleaning pipe 226a may include three holes to spray the water vapor, water and/or compressed gas on an outer side of the steam pipe 218.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An automated heating or foaming apparatus, comprising:
   a body;
   a stage connected to the body for supporting a container holding a consumable liquid;
   a steam pipe connected to the body and including a nozzle configured to inject water vapor or compressed gas into the consumable liquid to heat or foam the consumable liquid;
   an auto-clean cavity defined in the body and forming an elongate slot sized to rotatably receive the steam pipe for cleaning;
   at least one cleaning pipe connected to the body and in fluid communication with the auto-clean cavity to spray at least one of water vapor, water, and compressed gas on or through the steam pipe to clean the steam pipe; and
   a motor mounted to the body and operable to rotate the steam pipe laterally away from the stage and the container and into the auto-clean cavity for cleaning.

2. The automated heating or foaming apparatus according to claim 1, wherein the motor is operable to rotate the steam pipe between a working position, where the steam pipe injects the at least one of water vapor, water, and compressed gas into the consumable liquid, and a cleaning position, where the steam pipe is received within the auto-clean cavity to be cleaned.

3. The automated heating or foaming apparatus according to claim 1, further comprising a switching device configured to switch a flow of the at least one of the water vapor, water, and compressed gas between the steam pipe and the at least one cleaning pipe.

4. The automated heating or foaming apparatus according to claim 1, further comprising a water tank and a compressed gas tank, wherein the water tank and the compressed gas tank are each connected to at least one of the steam pipe and the at least one cleaning pipe.

5. The automated heating or foaming apparatus according to claim 1, wherein the at least one cleaning pipe laterally surrounds the steam pipe to spray the at least one of the water vapor, water, and compressed gas on an outer side of the steam pipe.

6. The automated heating or foaming apparatus according to claim 1, wherein an inner side of the steam pipe is cleaned by injecting the at least one of the water vapor, water, and compressed gas into the auto-clean cavity through the steam pipe.

* * * * *